March 13, 1956   H. F. SMITH   2,737,711
METHOD OF ASSEMBLING BALL COCKS AND THE LIKE
Filed Dec. 13, 1954
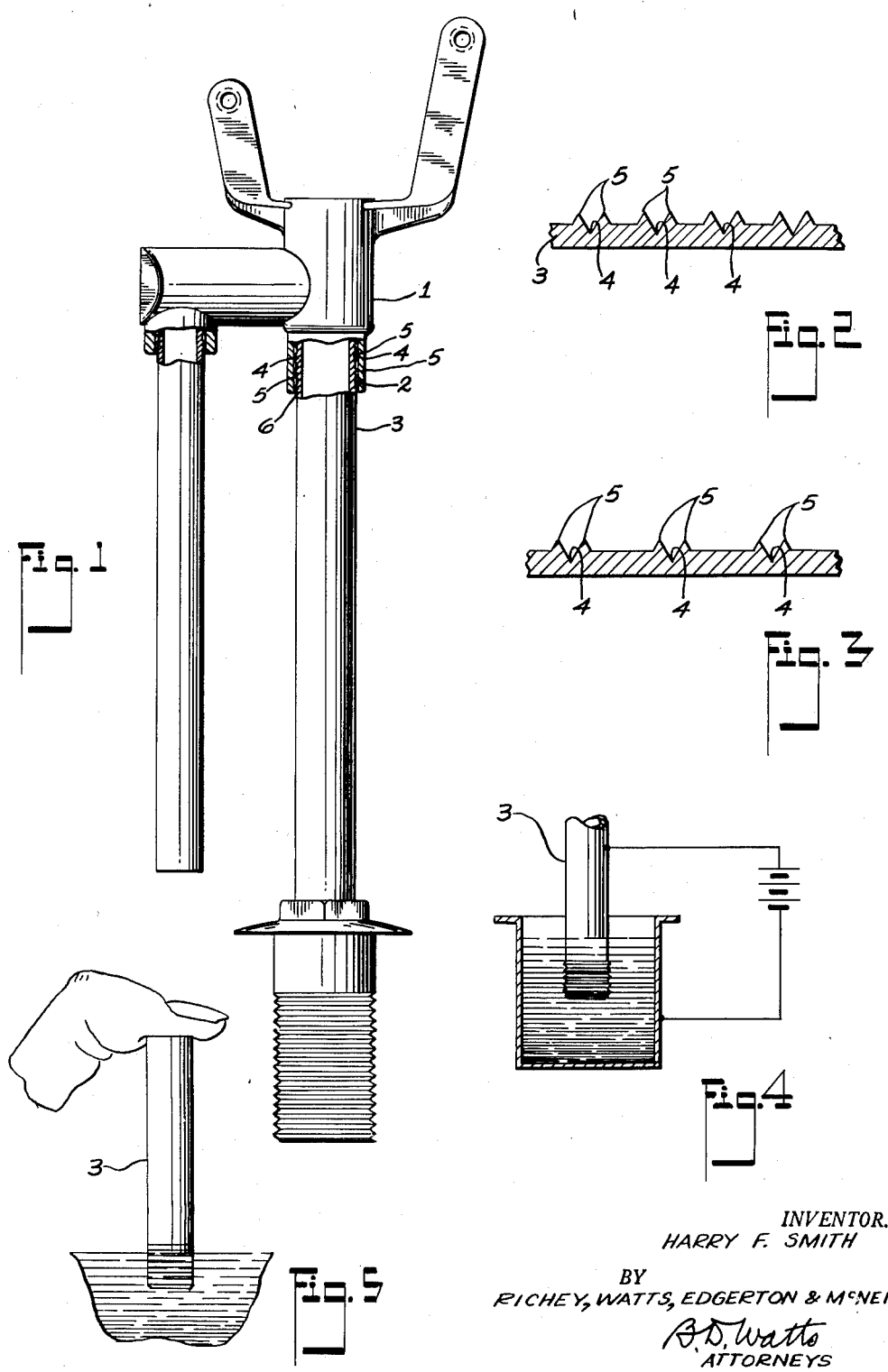
INVENTOR.
HARRY F. SMITH
BY
RICHEY, WATTS, EDGERTON & McNENNY
B.D. Watts
ATTORNEYS

United States Patent Office 2,737,711
Patented Mar. 13, 1956

2,737,711

METHOD OF ASSEMBLING BALL COCKS AND THE LIKE

Harry F. Smith, Lexington, Ohio, assignor to Mansfield Sanitary Pottery, Inc., Perrysville, Ohio, a corporation of Ohio Application December 13, 1954, Serial No. 474,827

2 Claims. (Cl. 29—474.4)

This invention relates generally to the art of joining metals and is particularly concerned with a new method of connecting a copper tube to the copper-containing body of a ball cock valve.

Ball cock valves for toilet tanks have brass or copper tubing united to a cast brass valve body. Usually these parts are assembled by threading each and screwing them together which requires that the tubing have a certain minimum wall thickness, or by soldering or brazing. Economy in manufacture requires that the wall thickness in the tubing be as thin as possible, but practical considerations require that the strength of the tubing be sufficient to withstand the water pressures to which it is subjected as well as the stresses incurred in handling and installing. Where the walls of the tubing are to be as thin as is possible and yet strong enough to withstand the water pressures, hard drawn unannealed copper tubing is required. Since it is difficult to form suitable threads on such tubing, many of the threaded joints develop leaks when tested or in use. When soldered joints are used, the necessary fluxes tend to corrode the tubing and also corrosion may be promoted by electrolytic action between the solder and tubing in water from certain localities. Furthermore, brazing or silver soldering requires high temperatures which may anneal the hard drawn tubing and weaken it to such an extent that thicker wall tubing must be used.

Another method of connecting thin copper tubing to a copper-containing body involves the use of mercury amalgam. According to this process mercury and copper powder are rubbed together to form a mass which will remain plastic for a few minutes and which, during that time, may be placed between the two parts to be united which are then held in assembled position until the amalgam passes from the plastic stage into the hard and strong crystalline stage. An important disadvantage of this process is the necessity for using the amalgam promptly after it is made and holding the pieces to be joined in the assembled position during the setting of the amalgam.

The present invention aims to avoid the disadvantages of the foregoing methods and to provide a method which may be carried out expeditiously and inexpensively and which will produce uniformly satisfactory joints.

The present invention will be better understood by those skilled in the art from the drawings which accompany and form a part of this specification and in which:

Fig. 1 is a side elevational view, partly in section, of a ball cock valve in which the body and tubes are connected by joints produced by the present invention;

Figs. 2 and 3 are fragmentary, enlarged sectional views showing different types and arrangements of grooves and ridges which may be used on tubes in practicing the present invention;

Fig. 4 shows diagrammatically the step of this invention of forming a mercury coating on a tube; and Fig. 5 shows diagrammatically a convenient manner of applying a coating of mercury to an amalgam coating on a tube.

According to the present invention the valve body 1 is drilled to produce a hole 2 a few thousandths of an inch larger in diameter than the outside diameter of the tube which is to be assembled with the body. The tube 3 which is to be connected to the body, and which may have an outside diameter from about .002 inch to .003 inch smaller than the diameter of the hole in the body, is deformed and thereby provided with alternate grooves 4 and ridges 5 on the end which is to enter the hole in the body. Preferably these grooves are from .005 inch to .015 inch deep. The process of forming these grooves and ridges exposes bright, clean metal surfaces and brings the tops of the ridges to a diameter several thousandths of an inch larger than that of the hole in the body. This deforming of the tube may be performed in any suitable manner as, for example, by rolling or by rotating the tube while holding a fixed tool against its outer surface. It is to be understood that the metal of the tube need not be removed but may simply be displaced to form the grooves and ridges. Hence this treatment does not weaken the tube.

Immediately after the completion of the deforming process the grooves and ridges are provided with a coating 6 of mercury by dipping in a solution of a salt of mercury, such as mercuric nitrate, or by electrodeposition, or by any other well-known method of applying a coating of mercury to the metal of the tube. After completion of this coating operation the tube may be stored, or assembled immediately with a body 1 as may be desired. Since considerable time is required for an amalgam to be formed on the tube and additional time is needed for the amalgam to harden, it is possible to store the thus coated tube for some time and then to make the desired joint without further application of mercury. However, when the storage time is longer it is preferable to cover the amalgam coating with mercury coating before proceeding to make the joint, as may be done by dipping the amalgam coated end of the tube in mercury as is shown in Fig. 5. When the tube, with or without the second coating, and the body are to be united, the coated end of the tube is then forced into the hole in the body. In this operation the surface of the hole is scraped clean and the ridges, which were of larger diameter than the diameter of the hole, are deformed and bent over and such deformation traps liquid mercury in the grooves and brings it into intimate contact with the inner surface of the hole in the body and thus wets the hole for substantially the entire length of the contact surface.

The mercury which is carried into the body by the tube combines or amalgamates with the metal of the body and crystallizes and thus firmly connects the tube and body throughout substantially all the opposed spaced apart surfaces. This combining or amalgamating action is old and well known and includes the diffusion of the copper into the mercury and the mercury into the copper. This diffusing action begins at places where the copper and mercury are in contact and progresses from those points throughout the mercury which is out of direct contact with the copper until sufficient copper has been absorbed by the mercury to produce solidified crystals of the resulting amalgam or alloy. While the speed of this action is accelerated by heat, it takes place at room temperature and without the application of pressure. Since the tube has a pressed fit and the parts retain their relative positions by reason thereof, it is unnecessary otherwise to hold them in assembled position while the amalgamating action is taking place. Since this action is completed quite promptly, the assembled joint may be tested very soon after the parts have been pressed together. Since the amalgamating action progresses until the opposed surfaces of the tube and body are connected substantially throughout their entire extent by amalgam, it follows that any joint found to be satisfactory by test made promptly after its completion will have increased strength and improved resistance to leakage when the joint has aged.

When the component metals are copper or copper alloys they are of approximately the same solution E. M. F., and there is substantially no tendency for electrolytic corrosion. Moreover, mercury is quite as resistant to all types of corrosion as is copper and, consequently, a joint made according to the present invention is substantially as permanent as either copper tubing or body. Another advantage of the present invention is that no deep threading of the tubing is required, very thin wall tubing may be used and no heat is employed which would anneal the hard drawn condition of the tubing.

If for any reason it is desired to accelerate the formation of the crystalline mercury amalgamation, this can be done by dusting the mercury on the tube with finely divided powdered metal such as copper or silver or an alloy of these or other suitable metals. Apparently the increase of surface contact between the mercury and this powdered metal accelerates the formation of hard amalgam. The formation of the hard amalgam can also be accelerated by heating the tubing to a temperature lower than that needed for ordinary soldering, for example, to about 200 or about 250° F.

It will be understood that the present invention is not restricted to the specific use above described for purposes of illustration. On the contrary, it may be used in making joints between other parts which are of various shapes and are for various uses. Also, while the tubes and bodies of ball cocks are usually made of copper or copper alloys, this invention is not limited to use with such metals but, on the contrary, is usable with any metal which will form an amalgam with mercury.

Having thus described the present invention so that others skilled in the art may be able to understand and practice the same, I state that what I desire to secure by Letters Patent is defined in what is claimed.

What is claimed is:

1. The method of joining a metal tube to a metal body which comprises the steps of employing a tube and a body composed of metal which will amalgamate with mercury, forming a hole in the body slightly larger in diameter than the outside diameter of the tube, forming shallow grooves and ridges on the end of the tube which is to enter the hole in the body by deforming the tube and thereby making the outside diameter of the ridges slightly larger than the diameter of said hole, coating with mercury the clean surfaces exposed by said deforming operation, pressing the thus coated end of the tube into the body thereby bringing the ridges into intimate contact with the surface of the hole, scraping that hole clean and deforming and bending over the said ridges and forming an amalgam joint in the spaces between the body and tube.

2. The method of joining a metal tube to a metal body which comprises the steps of employing a tube and a body composed of metal which will amalgamate with mercury, forming a hole in the body slightly larger in diameter than the outside diameter of the tube, forming shallow grooves and ridges on the end of the tube which is to enter the hole in the body by deforming the tube and thereby making the outside diameter of the ridges slightly larger than the diameter of said hole, coating the clean surfaces formed by this deforming operation with mercury and permitting an amalgam coating to form, dipping the thus coated end of the tube in mercury, pressing the thus dipped end of the tube into the hole in the body thereby bringing the ridges into intimate contact with the surface of the hole, scraping those surfaces clean, deforming and bending over the ridges and trapping liquid mercury in the grooves and forming an amalgam joint in the spaces between the body and tube.

References Cited in the file of this patent

UNITED STATES PATENTS

| | | |
|---|---|---|
| 2,094,482 | Weder | Sept. 28, 1937 |
| 2,094,483 | Weder | Sept. 28, 1937 |
| 2,174,218 | Greene | Sept. 26, 1939 |
| 2,503,429 | Ziegler | Apr. 11, 1950 |